United States Patent Office 2,974,165
Patented Mar. 7, 1961

2,974,165

METHOD FOR PRODUCING STABLE MATERIALS CONTAINING BORON-BORON BONDS

Robert J. Brotherton and Howard Steinberg, Fullerton, and Allen L. McCloskey, Orange, Calif., assignors to United States Borax & Chemical Corporation, Los Angeles, Calif., a corporation of Nevada No Drawing. Filed Feb. 4, 1959, Ser. No. 791,043

4 Claims. (Cl. 260—551)

This invention relates as indicated to a method for producing stable compounds containing boron-boron bonds and has particular reference to the synthesis of boron-boron bonds by reaction of diaminohaloboranes with active metals.

The syntheses of diboron compounds with triganol (SP$^2$) coplanar bonding have in the past been performed as for example by the arc discharge and microwave excitation preparations of $B_2Cl_4$, the synthesis of boron monoxide by the high temperature reaction of boron with boric oxide, etc. All of these prior art methods have been costly, slow, produced low yields or resulted in questionable end products.

It is therefore the principal object of this invention to provide a new and novel method for synthesizing boron-boron systems.

A further object is to provide a method for producing boron-boron materials which is economical, efficient and results in substantially high yields.

Other objects will appear as the description proceeds.

To the accomplishment of the foregoing and related ends the invention then comprises the features hereinafter fully described and pointed out in the claims, the following description setting forth in detail certain illustrative embodiments of the invention, these being indicative, however, of but a few ways in which the principle of the invention may be employed.

Broadly stated, the present invention comprises the method of producing compounds having boron-boron bonds which comprises the reaction of a diaminohaloborane with a metal having a continuously available clean active surface, said metal selected from the group consisting of the alkali metals, sodium-potassium alloys and sodium amalgam according to the general reaction:

$$2(R_2N)_2BX + 2M \rightarrow (R_2N)_2B\text{-}B(NR_2)_2 + 2MX$$

where M is the active metal, X is a halogen, and R is a material selected from the group consisting of hydrogen, alkyl groups of from 1–6 carbon atoms, and aryl groups.

It will be noted in the foregoing broadly stated paragraph that the reducing metal is specifically described as having a continuously available clean active surface. This is of the utmost importance in order for the reaction to proceed and to obtain a maximum yield. To have a continuously available clean active surface the metal must be either dispersed in a very small particle size or in a liquid or molten condition. Thus in effect it is necessary to have the metal in such a physical state where it presents a maximum surface area and which provides a continuously available active clean surface for reaction with the diaminohaloborane.

Referring to the diaminohaloboranes, the amino groups can be derived from primary and secondary aliphatic or aromatic amines. In the preferred embodiment of our invention we use diaminohaloboranes, the amino group of which is derived from secondary alkyl amines wherein the alkyl groups are a straight chain having from 1–6 carbon atoms.

The following list is a partial enumeration of those haloaminoboranes applicable to the present invention:

Bromobis(dimethylamino)borane
Chlorobis(dimethylamino)borane
Chlorobis(diethylamino)borane
Bromobis(di-isobutylanino)borane
Bromobis(n-propylamino)borane
Bromobis(di-n-hexylamino)borane
Dianilinochloroborane
Chlorobis(p-toluidino)borane
Bromobis(1-napthylamino)borane
Bromobis(diphenylamino)borane It is clearly understood that the foregoing is only a representative list of the more common haloaminoboranes which are applicable to the present invention. As for the halogen the iodo and fluoro compounds are also applicable to the present invention.

So that the present invention is more clearly understood the following examples are given:

I

A solution of 179 grams of bromobis(dimethylamino)-borane in 100 ml. of toluene was slowly added to 23 grams of highly dispersed sodium in 400 ml. of toluene in a nitrogen atmosphere. After two hours in refluxing toluene the reaction mixture was allowed to cool and the resulting sodium bromide was removed by filtration. The toluene was removed from the filtrate by vacuum distillation and the residue was distilled to give 59.4 grams (60% yield) of tetra(dimethylamino)diboron, B.P. 46–47° C./0.5 mm., $n_D^{25}$=1.4684.

Chemical analysis of the product yielded the following results:

C=48.40 (theory 48.55)
H=12.19 (theory 12.22)
N=28.95 (theory 28.31)
B=11.00 (theory 10.94%)
Mol. wt.=194.1 (theory 197.9)

II

This reaction was carried out as described in Example I, except chlorobis(dimethylamino)borane was used instead of the bromobis(dimethylamino)borane. The same product was obtained in comparable yield; however, the reaction time was longer than with the bromo compound.

III

Example I was repeated except that a highly dispersed potassium was used instead of sodium as the reducing metal. The product obtained was the same as in Example I and II.

IV

Example I was again repeated except sodium-potassium alloys were used as the active metal. The alloys used included 9–1 and 3–1 potassium to sodium weight ratios. The results again were comparable with Example I.

Other modes of applying the principle of the invention may be employed provided the features stated in any of the following claims or the equivalent of such be employed.

We, therefore, particularly point out and claim as our invention:

1. The method of producing compounds having boron-boron bonds which comprises the reaction of a diaminohaloborane with a metal having a continuously available clean, active surface, said metal selected from the group consisting of the alkali metals, sodium-potassium alloys, and sodium amalgam, as follows:

$$2(R_2N)_2BX + 2M \rightarrow (R_2N)_2B\text{-}B(NR_2)_2 + 2MX$$

where M is the active metal, X is a halogen and R is a material selected from the group consisting of hydrogen alkyl groups of from 1-6 carbon atoms and aryl groups.

2. The method of producing tetra(dimethylamino)diboron which comprises the reaction of halobis(dimethylamino)borane with a metal having a continuously available clean, active surface, said metal selected from the group consisting of the alkali metals, sodium-potassium alloys and sodium amalgam, removing the metal halide and recovering the tetra(dimethylamino)diboron.

3. The method of producing tetra(dimethylamino)diboron which comprises the reaction of bromobis(dimethylamino)borane with a metal having a continuously available clean, active surface, said metal selected from the group consisting of alkali metals, sodium-potassium alloys and sodium amalgam, removing metal bromide and recovering the tetra(dimethylamino)diboron.

4. The method of producing tetra(dimethylamino)diboron which comprises reaction of chlorobis(dimethylamino)borane with a metal having a continuously available clean, active surface, said metal selected from the group consisting of alkali metals, sodium-potassium alloys, and sodium amalgam, removing metal chloride and recovering the tetra(dimethylamino)diboron.

References Cited in the file of this patent

Coates: Journal Chem. Soc. (vol. 1950, pp. 3481-83), 1950.

Lappert: Chemical Reviews (vol. 56, pages 1054-55), 1956.